Patented May 21, 1946

2,400,710

UNITED STATES PATENT OFFICE 2,400,710

PRODUCTION OF RIBOFLAVIN

Henry D. Piersma, Kalamazoo, Mich., assignor to Lederle Laboratories, Inc., New York, N. Y., a corporation of Delaware No Drawing. Application October 6, 1943,
Serial No. 505,189

7 Claims. (Cl. 195—35)

The present invention relates to the preparation of riboflavin, and more particularly, relates to a process by which riboflavin and/or riboflavin-containing concentrates may be prepared cheaply from readily available raw materials.

In accordance with the present invention it has been found that riboflavin can be produced in good yields by growing the fungus, *Eremothecium ashbyii*, in a liquid medium containing as the essential ingredients an animal proteinaceous material, a carbohydrate, and a malt extract.

The fungus, *Eremothecium ashbyii*, is fully described by A. Guilliermond in Compt. rend. acad. sci., 200 (1935) 1556. Guilliermond, Fontaine, and Raffy, in Compt. rend. acad. sci., 201 (1935) 1077, reported that *Eremothecium ashbyii* contained a yellow pigment related to the flavin group. Raffy, in C. R. S. B., 126, 875–77 (1937), by biological means showed that the yellow pigment of *Eremothecium ashbyii* possessed the growth properties of lactoflavin. Mirimanoff and Raffy, in Helvetica Chimica Acta, 21 (1935) 1004, succeeded in isolating riboflavin from an agar culture medium on which *Eremothecium ashbyii* had been grown. From a scientific standpoint the references are of considerable importance, but from a commercial standpoint the processes described have no practical significance since the amount of riboflavin produced represented not more than about fifty gamma per gram of material.

In accordance with the present invention I have found that riboflavin can be produced very economically on a commercial scale by utilizing a new type of media for growing the fungus, *Eremothecium ashbyii*. The new type of media which I employ is one containing as the essential ingredients an animal proteinaceous material (vertebrate), a carbohydrate, and a malt extract.

In carrying out the present invention a medium comprising water, an animal proteinaceous material, a carbohydrate, and a malt extract, is inoculated with a culture of *Eremothecium ashbyii* and incubated at a temperature of from about 20 to 37° C. for a suitable period of time. During the incubation period a generous supply of oxygen is made available. In this process riboflavin, in amounts of from 150 to 500 gamma per milliliter of media can be obtained.

When desired, the pure riboflavin can be recovered from the aqueous solution. If desired, the aqueous solution, separated from the solid constituents of the medium, may be concentrated to produce a concentrate high in riboflavin values. This concentrate may be used advantageously as a supplement to animal foods. On the other hand, if desired, the entire medium, including the fungus growth, may be utilized directly as an animal food or as a supplement to animal foods. In most cases it would be more desirable to remove the water by suitable means and utilize the solid residue as an animal food or as a supplement to an animal food.

It is an advantage of the present invention that a new and improved process is provided for the production of riboflavin. It is also an advantage of the present invention that high yields of riboflavin are obtained much more economically than heretofore possible. It is a further advantage of the present invention that an animal food substance having high nutrient values is made available.

The carbohydrate material employed in the medium can be any one or a combination of carbohydrates, including those such as glucose, maltose, and sucrose. Impure mixtures of carbohydrates, including molasses, corn syrup, and the like may similarly be utilized. In some cases the carbohydrate source may be derived entirely from the malt extract. This is particularly true where malt extracts having high maltose content are available. The amount of carbohydrate employed in the medium may be varied somewhat, the most desirable range being from about 0.25 to 1.5%. The use of a larger amount, however, is not precluded.

The malt extract employed in the medium includes the commercially available malt extracts and may in some cases contain additional substances, i. e., hops. The amount of malt extract utilized in the medium can be varied from about 0.5 to about 5%; the optimum amount, however, is about 1.5 to 2%.

The animal proteinaceous materials employed in the media include a wide variety of animal products. Among those that may be mentioned are liver, pancreas, spleen, lung, kidney, and similar tissues obtained from the slaughter of animals. Similarly, substances, such as tankage, fish meal, dried blood, serum residues, and the like, may be employed. It is obvious that the animal proteinaceous materials need not be derived from any particular species of animal and, hence, the materials may be obtained from cattle, hogs, horses, sheep, fowl, fish, etc. Best results are obtained when the animal proteinaceous material constitutes from 1 to 5% of the media.

In order to illustrate the invention a series of experiments will be described in the following examples. It is to be clearly understood, however, that the examples are given by way of illustration and not of limitation.

EXAMPLE 1

250 ml.-flasks containing 25 ml. of the desired liquid medium were inoculated with cultures of *Eremothecium ashbyii*. The inoculated flasks were placed in a shaking apparatus to facilitate the introduction of oxygen by aeration during growth. The pH of the media was adjusted to 5.5 to 6.5 at the beginning of the incubation period. During the incubation period a temperature of about 27° C. was maintained. In this particular experiment four flesh tissues of the hog were used for the nitrogen source in the media. The results of the experiment are set forth in the following table:

Table I

| Flask No. | Description of media (per cent not otherwise accounted for represents water) | Hrs. growth | Final pH | Riboflavin assay results fluorometric $\gamma$/ml. |
|---|---|---|---|---|
| 1 | 4.0% lung tis.+0.25% glucose | 96 | 8.5 | 7.9 |
| 2 | 4.0% lung tis.+0.28% malt ext.+0.25% glucose | 96 | 7.45 | 83 |
| 3 | 4.0% lung tis.+0.56% malt ext.+0.25 glucose | 96 | 7.68 | 159 |
| 4 | 4.0% lung tis.+1.12% malt ext.+0.25 glucose | 96 | 6.9 | 88 |
| 5 | 4.0% spleen tis.+0.25 glucose | 96 | 7.75 | 143 |
| 6 | 4.0% spleen tis.+0.25% glucose+0.28% malt ext | 96 | 7.7 | 105 |
| 7 | 4.0% spleen tis.+0.25% glucose+0.56% malt ext | 96 | 7.93 | 59 |
| 8 | 4.0% spleen tis.+0.25% glucose+1.12% malt ext | 96 | 7.75 | 119, 128 |
| 9 | 4.0% pancreas tis.+0.25% glucose | 96 | 7.38 | 113 |
| 10 | 4.0% pancreas tis.+0.25% glucose+0.28% malt ext | 96 | 7.51 | 236 |
| 11 | 4.0% pancreas tis.+0.25% glucose+0.56% malt ext | 96 | 7.6 | 143 |
| 12 | 4.0% pancreas tis.+0.25% glucose+1.12% malt ext | 96 | 6.75 | 129 |
| 13 | 4.0% kidney tis.+0.25% glucose | 96 | 7.65 | 76 |
| 14 | 4.0% kidney tis.+0.25% glucose+0.28% malt ext | 96 | 7.67 | 108 |
| 15 | 4.0% kidney tis.+0.25% glucose+0.56% malt ext | 96 | 7.99 | 176 |
| 16 | 4.0% kidney tis.+0.25% glucose+1.12% malt ext | 96 | 7.82 | 178 |
| 17 | 0.28% malt ext.+0.25% glucose | 96 | 5.17 | 3.4 |
| 18 | 0.56% malt ext.+0.25% glucose | 96 | 5.32 | 3.9 |
| 19 | 1.12% malt ext.+0.25% glucose | 96 | 4.73 | 39 |

From the above results it is evident that the media containing the various animal tissues plus glucose and malt extract gave higher yields of riboflavin than the corresponding tissue plus glucose, with the exception of spleen. It is also noted that the media containing simply malt and glucose gave extremely low yields of riboflavin.

EXAMPLE 2

A series of experiments was carried out utilizing liver substances as the source of nitrogen in the media. The technique employed is essentially as described in Example 1. The results are reported in the following table:

Table II

| Flask No. | Description of media (percent not otherwise accounted for represents water) | Hrs. growth | Final pH | Riboflavin assay results Fluorometric, $\gamma$/ml. | Riboflavin assay results L. casei, $\gamma$/ml. |
|---|---|---|---|---|---|
| 1 | 2.0% dry liver cake [1] plus 5.0% of 80%-alc.-insol. liver plus 0.50% glucose plus 0.15% malt extract. | 72 | 6.12 | 120 | 114.0 |
| 2 | As (1) but 0.28% malt extract | 72 | 6.02 | 146 | 97.0 |
| 3 | As (1) but 0.70% malt extract | 72 | 5.98 | 138 | 142.5 |
| 4 | As (1) but 1.75% malt extract | 72 | 5.88 | 168 | 165.5 |
| 5 | As (1) but 2.4% malt extract | 72 | ----- | 148 | 143.0 |
| 6 | As (1) but 3.0% malt extract | 72 | 5.94 | 220 | 197.5 |

[1] Residue from an aqueous extraction of liver.

It is evident from the above experiments that liver can be successfully employed in a liquid medium together with a carbohydrate and a malt extract, as the nitrogen source for producing riboflavin from the fungus, *Eremothecium ashbyii*.

EXAMPLE 3

An experiment was set up to determine the relative merits of three malt extracts, A, B, and C. The arrangement of the experiment and the results obtained are found in the following table:

Table III

| Flask No. | Description of media (percent not otherwise accounted for represents water) | Hrs. growth | Final pH | Riboflavin assay results Fluorometric, $\gamma$/ml. | Riboflavin assay results L. casei, $\gamma$/ml. |
|---|---|---|---|---|---|
| 1 | 2.0% dry liver cake [1]+5.0% 80%-alc.-insol. liver+0.50% glucose—control. | 88 | 6.22 | 156 | 154.5 |
| 2 | As (1) plus 0.28% malt extract, A | 88 | 6.13 | 170 | 170.0 |
| 3 | As (1) plus 0.70% malt extract, A | 88 | 6.0 | 166 | 168.0 |
| 4 | As (1) plus 1.75% malt extract, A | 88 | 5.9 | 196 | 184.0 |
| 5 | As (1) plus 3.50% malt extract, A | 88 | 5.84 | 224 | 202.0 |
| 6 | As (1) plus 0.28% malt extract, B | 88 | 6.09 | 178 | 162.0 |
| 7 | As (1) plus 0.70% malt extract, B | 88 | 6.05 | 170 | 164.5 |
| 8 | As (1) plus 1.75% malt extract, B | 88 | 5.85 | 208 | 183.0 |
| 9 | As (1) plus 3.50% malt extract, B | 88 | 5.65 | 206 | 196.0 |
| 10 | As (1) plus 0.28% malt extract, C | 88 | 6.25 | 176 | 180.5 |
| 11 | As (1) plus 0.70% malt extract, C | 88 | 6.09 | 188 | 177.5 |
| 12 | As (1) plus 1.75% malt extract, C | 88 | 6.35 | 178 | 175.0 |
| 13 | As (1) plus 3.50% malt extract, C | 88 | 5.93 | 200 | 199.0 |

[1] Residue from an aqueous extraction of liver.

The results show that all three malt extracts are satisfactory and that the yields obtained are higher than the control using no malt extract.

EXAMPLE 4

Six 250 ml.-flasks containing 25 ml. of the desired liquid media were inoculated with cultures of *Eremothecium ashbyii*. The flasks were then subjected to aeration during the incubation period, wherein a temperature of from 27 to 30° C. was maintained. The pH of the various media was adjusted to about 5.5 at the beginning of the incubation period. The results of the experiments are set forth in the following table:

Table IV

| Flask No. | Description of media (per cent not otherwise accounted for represents water) | Hrs. growth | Final pH | Riboflavin assay results fluorometric, γ/ml. |
|---|---|---|---|---|
| 1 | 1.0% liver cake [1]+0.5% sucrose+1.75% malt ext | 88 | 5.40 | 123 |
| 2 | 1.0% liver cake [1]+0.5% sucrose+1.75% malt ext | 88 | 5.38 | 123 |
| 3 | 2.0% liver cake [1]+0.5% sucrose+1.75% malt ext | 88 | 5.58 | 160 |
| 4 | 2.0% liver cake [1]+0.5% sucrose+1.75% malt ext | 88 | 5.76 | 167 |
| 5 | 4.0% liver cake [1]+0.5% surcose+1.75% malt ext | 88 | 6.03 | 304 |
| 6 | 4.0% liver cake [1]+0.5% sucrose+1.75% malt ext | 72 | 6.02 | 252 |

[1] Residue from an aqueous extraction of liver.

In other experiments wherein the medium was modified by utilizing various quantities of dry liver cake, wet liver cake, 65%-alcohol-insoluble liver, together with varying quantities of glucose, sucrose, or molasses, and malt extracts, yields of from 150 gamma to 400 gamma were regularly obtained. In these experiments the pH of the liquid at the beginning of the incubation period was varied from 5.5 to 6.5. The incubation period employed was from 18 to 160 hours, and the temperatures employed were from 25 to 34° C. In all experiments air or oxygen was introduced during the growth period.

Liver cake is preferred as the animal proteinaceous material in my process since it is readily available as a by-product and hence affords an economical advantage. For the purposes of the present specification and claims liver cake may be defined as the substantially water-insoluble solids present in liver. The term "liver cake," therefore, includes whole liver substance as well as the residue remaining after an aqueous extraction of liver, such as is practiced in the manufacture of pharmaceutical liver preparations.

In animal feeding experiments it has been shown that the products obtained in accordance with the present invention can be used for improving the nutritional value of animal foods. The products derived from the growth of *Eremothecium ashbyii* in a medium containing liver cake are especially useful as food substances.

What I claim is:

1. A process of preparing riboflavin which comprises growing the fungus, *Eremothecium ashbyii*, in a liquid medium containing as the essential ingredients water, an animal proteinaceous material, a carbohydrate, and a malt extract while aerating the medium.

2. A process of preparing riboflavin which comprises growing the fungus, *Eremothecium ashbyii*, in a liquid medium containing as the essential ingredients water, liver tissue, a carbohydrate, and a malt extract while aerating the medium.

3. A process of preparing riboflavin which comprises growing the fungus, *Eremothecium ashbyii*, in a liquid medium containing as the essential ingredients water, liver tissue, glucose, and malt extract while aerating the medium.

4. A process of preparing riboflavin which comprises growing the fungus, *Eremothecium ashbyii*, in a liquid medium containing as the essential ingredients water, pancreas tissue, a carbohydrate, and a malt extract while aerating the medium.

5. A process of preparing riboflavin which comprises growing the fungus, *Eremothecium ashbyii*, in a liquid medium containing as the essential ingredients water, pancreas tissue, glucose, and malt extract while aerating the medium.

6. A process of preparing riboflavin which comprises growing the fungus, *Eremothecium ashbyii*, in a liquid medium containing as the essential ingredients water, from about 1 to about 5% of liver cake, about 0.5% glucose, and about 1.75% malt extract while aerating the medium.

7. A process of preparing riboflavin which comprises growing the fungus, *Eremothecium ashbyii*, in a liquid medium containing as the essential ingredients water, from about 1 to about 5% of spleen tissue, about 0.5% glucose, and about 1.75% malt extract while aerating the medium.

HENRY D. PIERSMA.